Oct. 24, 1939.  G. M. HEFFERIN  2,177,565
THRUST COLLAR
Filed June 7, 1938   2 Sheets-Sheet 1

Inventor
G. M. Hefferin

By Clarence A. O'Brien
and Hyman Berman
Attorneys

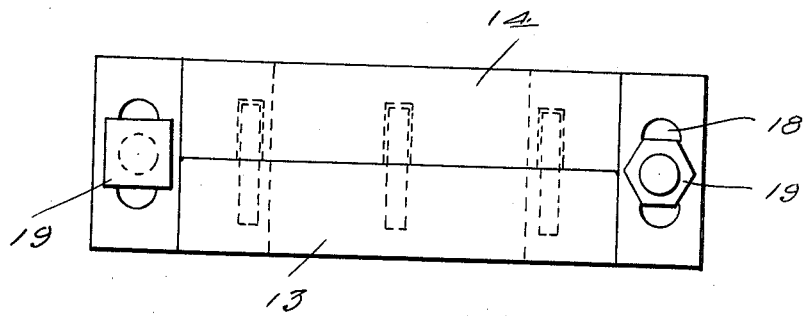
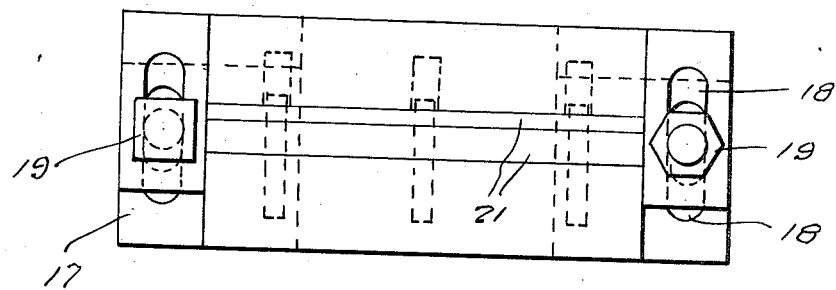
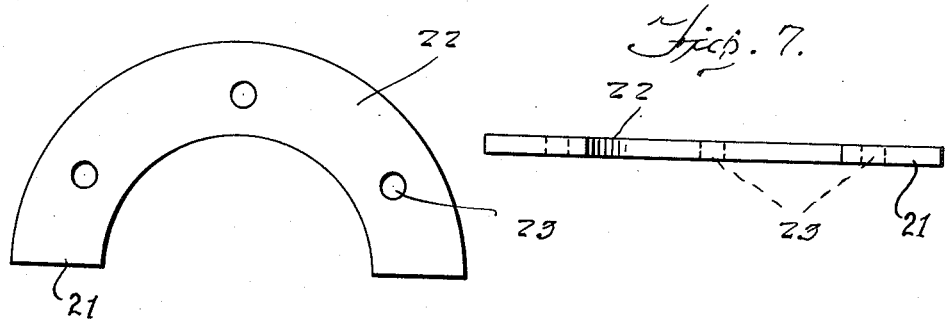

Patented Oct. 24, 1939

2,177,565

UNITED STATES PATENT OFFICE 2,177,565

THRUST COLLAR

George Michel Hefferin, Mesa, Ariz., assignor to Elizabeth E. Robinson, Mesa, Ariz.

Application June 7, 1938, Serial No. 212,356

1 Claim. (Cl. 308—161)

This invention relates to thrust collars employed on shafting and has for the primary object, the provision of an efficient and inexpensive device of this character which may be easily mounted on a shaft between shaft bearings for limiting shaft thrusts and which may be easily and quickly adjusted to compensate for wear as the latter occurs.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a thrust collar constructed in accordance with my invention.

Figure 4 is a plan view illustrating companion sections of the collar and the connecting means between said sections.

Figure 5 is a view similar to Figure 4 showing shims in position for adjusting the companion sections of the collars relative to each other.

Figure 6 is a plan view illustrating one of the sections of the shims.

Figure 7 is an edge view illustrating one of the sections of the shims.

Figure 1:
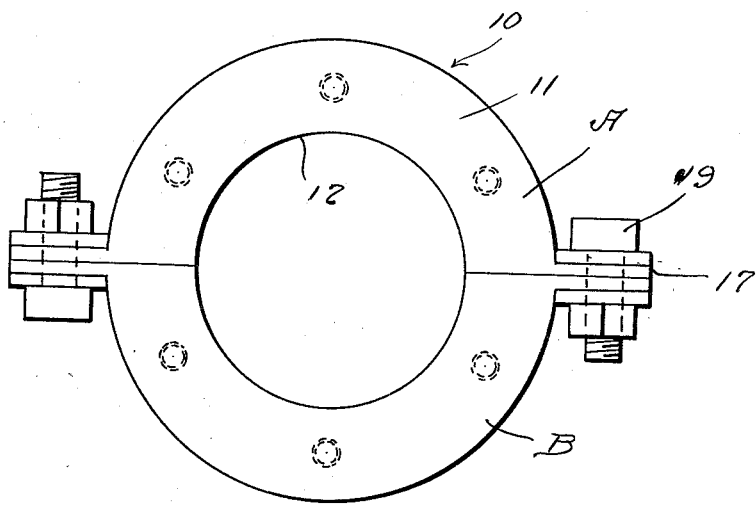

Referring in detail to the drawings, the numeral 10 indicates in entirety the thrust collar having side bearing faces 11. The collar presents a circular opening 12 to receive a shaft. It is to be understood that this collar operates on the shaft between bearings (not shown) of the shaft. The securing of the collar on the shaft can be accomplished in any well known manner. The collar is composed of a pair of one-half sections A and B and each section includes companion semicircular shaped members 13 and 14 arranged in abutting engagement. The member 13 has secured therein pins 15 which fit in sockets 16 formed in the member 14. These pins permit easy separation of the members when desired and normally prevent rotation of the members relative to each other. Formed on the ends of the members are ears or flanges 17 having slots 18 to receive fasteners 19 each in the form of a bolt and nut. The ears or flanges are so arranged that they will overlap when the sections A and B are brought together permitting the slots to align so that the fasteners 19 may be easily applied or removed. The slots 18 also permit the members of each section to be adjusted towards and from each other so that as wear occurs on the faces 11 shims may be employed between said members for taking up wear. The shims are indicated by the character 21 and the thicknesses may vary to meet with different operating conditions. Each shim 21 consists of semicircular shaped sections 22, each section having openings 23 to permit the pins of the companion members to pass therethrough when the shim section is arranged between the members. The pins extending through the shims prevent the latter from working out from between the members of the collar and will permit the shims to be easily and quickly applied and removed from a collar as desired.

Figures 2, 3:
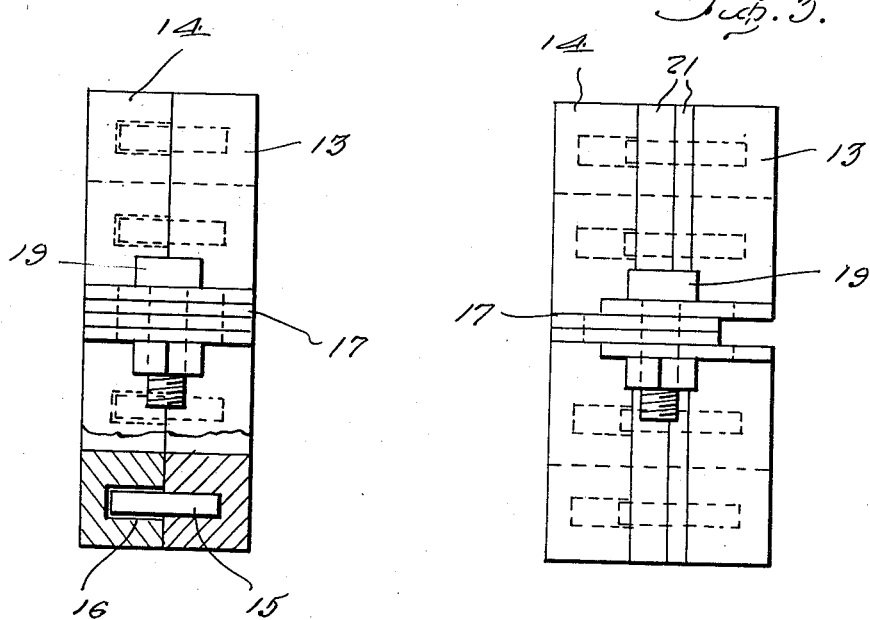
Figure 2 is an edge elevation, partly in section, illustrating the device.
Figure 3 is a view similar to Figure 2 showing the collar adjusted through the use of shims.

In the Figure 3 the members of the collar are shown adjusted to the use of a pair of shims and any number of shims may be employed as long as the pins of one of the members will extend into the sockets of the companion member.

The collar described in detail and shown in the drawings will limit lateral thrust of the shaft to a predetermined amount for which the collar is set for on the shaft and is easily and quickly adjustable to compensate for wear caused by taking up the thrust. With limiting of the thrust excess wear and subsequent repairs are reduced to a minimum.

It is beleived that the foregoing description, when taken in connection with the drawings will fully set forth the construction and advantages of the present invention to those skilled in the art to which such a device relates, so that further detailed description will not be required.

Having described the invention, what I claim is:

A thrust collar comprising an annular body composed of a pair of one-half sections and each section including companion semicircular shaped members arranged opposite to each other, certain of said members having sockets, pins formed on the companion members to the members having the sockets and fitting in said sockets, sectional shims having openings to receive said pins and secured thereby between the companion members, flanges formed on the ends of the members and having slots, the flanges of the members of one section adapted to overlap with the flanges of the members of the other section with the slots thereof in alignment, and fasteners extending through the slots.

GEORGE MICHEL HEFFERIN.